US008704535B2

(12) United States Patent
Chen et al.

(10) Patent No.: US 8,704,535 B2
(45) Date of Patent: Apr. 22, 2014

(54) LAYOUT FOR ANTENNA LOOPS HAVING BOTH FUNCTIONS OF CAPACITANCE INDUCTION AND ELECTROMAGNETIC INDUCTION

(75) Inventors: Wei-Chou Chen, Hsin-Chu (TW); Ke-Wei Chen, Hsin-Chu (TW); Chia-Te Huang, Hsin-Chu (TW)

(73) Assignee: Waltop International Corporation, Hsinchu (TW)

( * ) Notice: Subject to any disclaimer, the term of this patent is extended or adjusted under 35 U.S.C. 154(b) by 365 days.

(21) Appl. No.: 12/904,307

(22) Filed: Oct. 14, 2010

(65) Prior Publication Data

US 2011/0227588 A1   Sep. 22, 2011

(30) Foreign Application Priority Data

Mar. 22, 2010   (TW) .............................. 99108333 A

(51) Int. Cl.
*G01R 27/26*   (2006.01)
(52) U.S. Cl.
USPC .......... 324/654; 345/173; 345/174; 455/13.3; 455/121; 455/274; 455/562.1
(58) Field of Classification Search
USPC ................. 324/654, 250, 343, 649; 343/824; 345/173, 174; 455/13.3, 121, 274, 455/562.1
See application file for complete search history.

(56) References Cited

U.S. PATENT DOCUMENTS

| | | | | |
|---|---|---|---|---|
| 4,878,553 A | * | 11/1989 | Yamanami et al. ........ | 178/18.07 |
| 6,175,723 B1 | * | 1/2001 | Rothwell, III .............. | 455/63.1 |
| 6,246,393 B1 | * | 6/2001 | Watanabe et al. ............ | 345/173 |
| 6,297,811 B1 | * | 10/2001 | Kent et al. ...................... | 345/173 |
| 6,555,235 B1 | * | 4/2003 | Aufderheide et al. ........ | 428/447 |
| 6,606,068 B1 | * | 8/2003 | Chao et al. .................... | 343/742 |
| 6,621,470 B1 | * | 9/2003 | Boeringer et al. ............ | 343/853 |
| 6,787,715 B2 | * | 9/2004 | Chao et al. ................. | 178/18.01 |
| 6,927,742 B2 | * | 8/2005 | Chen ............................. | 343/867 |
| 8,339,372 B2 | * | 12/2012 | Rofougaran ................... | 345/173 |
| 2004/0130534 A1 | * | 7/2004 | Chao et al. .................... | 345/173 |
| 2006/0290573 A1 | * | 12/2006 | Puente Baliarda et al. ... | 343/700 MS |
| 2010/0207891 A1 | * | 8/2010 | Wang ............................ | 345/173 |

OTHER PUBLICATIONS

Ndamukunda, I., Study of Smart Antennas on Mobile Communications, Chap. 3: Antenna Arrays and Beam Forming, Memoire—Online, Telecom 2006.*

* cited by examiner

*Primary Examiner* — Huy Q Phan
*Assistant Examiner* — Giovanni Astacio-Oquendo
(74) *Attorney, Agent, or Firm* — Huffman Law Group, P.C.

(57) ABSTRACT

The present invention relates to a layout for antenna loops having both functions of capacitance induction and electromagnetic induction, and particularly relates to the layout for antenna loops having both functions of capacitance induction and electromagnetic induction, wherein the capacitance detection elements are integrated with the antenna loops. In this layout for antenna loops, each of the antenna loops therein is separated into three sections, and there are several geometric structures fabricated in two of these sections. These geometric structures are capacitance detection elements. Therefore, the two sections are directly fabricated to be the capacitance detection elements because of these geometric structures. By this way, the antenna loops can be integrated with the capacitance detection elements and the capacitance detection elements do not prevent the antenna loops from receiving the electromagnetic signals.

29 Claims, 11 Drawing Sheets

LAYOUT FOR ANTENNA LOOPS HAVING BOTH FUNCTIONS OF CAPACITANCE INDUCTION AND ELECTROMAGNETIC INDUCTION

FIELD OF THE INVENTION

The present invention relates to a layout for antenna loops having both functions of capacitance induction and electromagnetic induction, and particularly relates to the layout for antenna loops having both functions of capacitance induction and electromagnetic induction, wherein the capacitance detection elements are integrated with the antenna loops.

BACKGROUND OF THE INVENTION

Because the hand writing technology is applied to various kinds of electric devices popularly, for example computer, tablet, cell phone or PDA, the capacitance induction technology and the electromagnetic induction technology are applied to these devices popularly. In the electric devices applying the electromagnetic induction technology, there are some antenna loops applied to electromagnetic inducing with a special pointing device, for example a special pen, for hand writing. In the electric devices applying the capacitance induction technology, a user can directly use his fingers to hand writing thereon because there are many capacitance induction elements applied to capacitance inducing the user's fingers. Although the electromagnetic induction technology has the characteristics of detecting the position of the special pointing device precisely and detecting the pressure applied to the tablet, but it has a need to use a special pointing device for hand writing. Therefore, it is inconvenient to the user. Although a user can use his fingers to hand write on the electric devices applying to the capacitance induction technology and it is convenient to the user, but the electric devices can not detect the position of the use's fingers precisely.

However, users need to adopt different inputting methods (or mode) in to different situations. For example, it is convenient to the user by directly using his fingers to select functions because it needs not to detect the position of the use's fingers precisely. However, when the user writes or paints on the electric device, it needs detect the position of the use's fingers or the special pointing device precisely. Therefore, the user can not directly use his fingers to write or paint on the electric device and it needs a special pointing device for hand writing. Therefore, it has a need of an electric device being capable of applying both of the capacitance induction technology and electromagnetic induction technology for inputting. Nowadays, some devices adopting both of the capacitance induction technology and electromagnetic induction technology are developed because this need. Referring to FIG. 1A, it is an exploded diagram illustrating a conventional inputting device 10 having both function capacitance induction and electromagnetic induction. A protective cover 12, a touch board 14, and an antenna loop board 16 are stacked to form the conventional inputting device 10. There are several capacitance induction elements (touch elements) distributed in both of the two directions (X-direction and Y-direction) of two-dimensional Cartesian coordinates on the touch board 14 for forming a capacitance induction elements (touch elements) array 18. There are several antenna loops 20 distributed in both of the two directions (X-direction and Y-direction) of two-dimensional Cartesian coordinates on the antenna loop board 16. The conventional inputting device 10 applies the capacitance induction elements (touch elements) array 18 deposed on the touch board 14 to capacitance induce with user's fingers, so user can directly use his fingers for hand writing on the conventional inputting device 10. The conventional inputting device 10 applies the antenna loops 20 deposed on the antenna loops board 16 to electromagnetically induce with a special pen for precise hand writing, for example writing or painting on the conventional inputting device 10. Therefore, the conventional inputting device 10 can adopt different input mode (capacitance induction mode or electromagnetic induction mode) in different situations.

Generally, the touch board is put above the antenna loops board 16 because the capacitance induction elements (touch elements) array 18 deposed on the touch board 14 need to be approached to the surface of the conventional inputting device 10 for good capacitance induction. However, in this sequence of this structure, the capacitance induction elements (touch elements) array 18 shields the antenna loops 20 deposed on the antenna loops board 16 from receiving the electromagnetic signals emitted or reflected by a pointing device (for example a special pen). The U.S. patent (US20090166100) provides a new capacitance induction elements (touch elements) array for solving this problem. Referring to FIG. 1B, it illustrates the capacitance induction elements (touch elements) array 18 provided in this patent. As common capacitance induction elements (touch elements) array, there are many capacitance induction elements (touch elements) 17 of this array 18 are distributed in both of the two directions (X-direction and Y-direction) of two-dimensional Cartesian coordinates, but there are many slit 19 formed on the capacitance induction elements (touch elements) 17 for the electromagnetic signals transmitted or reflected form the pointing device (for example a special pen) to pass through and to transmit to the antenna loops on the antenna loop board. Therefore, the precision of the electromagnetic induction is improved by this structure.

Although the situation that the electromagnetic signals are shielded by the capacitance induction elements (touch elements) is improved by this method, but the shielding can not be removed completely. Furthermore, it is difficult to form silts on small capacitance induction elements (touch elements) and the process for fabricating these slits is complicated. Therefore, it has a need of more cost and time for forming these capacitance induction elements (touch elements). Besides, the cost for fabricating these capacitance induction elements (touch elements) is increased because the capacitance induction elements (touch elements) and the antenna loops are respectively formed on different substrates for forming a touch board and an antenna loops board. Therefore, in view of foregoing drawbacks of conventional inputting device, there is a need to provide a layout for antenna loops having the characteristics of low cost, simple fabricating process and having both functions of capacitance induction and electromagnetic induction. Furthermore, the electromagnetic signals are not shielded by the capacitance induction elements (touch elements) in this layout.

SUMMARY OF THE INVENTION

An objective of this invention is to provide a layout for antenna loops having both functions of capacitance induction and electromagnetic induction. In this layout, the capacitance detection elements are integrated with the antenna loops to form on the same substrate for avoiding the situation that the capacitance detection elements shields the antenna loops from the electromagnetic signals. Furthermore, the cost of this layout is decreased and the process for fabricating this layout is simplified.

In one embodiment of the present invention, the layout for antenna loops having both functions of capacitance induction and electromagnetic induction, wherein the capacitance detection elements are integrated with the antenna loops, is disclosed. This layout for antenna loops having both functions of capacitance induction and electromagnetic induction comprises at least one first antenna section, at least one second antenna section, at least one first connecting section, a first switch assembly, a ground, and a ground switch assembly. The first antenna section has a first connecting terminal, a first signal terminal, and several first geometric structures arranged in the first antenna section. The second antenna section has a second connecting terminal, a second signal terminal, and several second geometric structures arranged in the second antenna section. Each second antenna section is corresponded to one first antenna section and the second antenna section is parallel to the corresponded first antenna section. The first connecting section is used for connecting the first antenna section with the second antenna section corresponded to the first antenna section.

The first switch assembly is deposed between the first connecting terminal and the first connecting section and between the second connecting terminal and the first connecting section for controlling the first antenna section, the second antenna section and the first connecting section to be electrically connected with each for forming a first antenna loop. The ground switch assembly is connected with the second signal terminal of the second antenna section for controlling the second signal terminal to electrically connect with the ground and for controlling the first antenna section, the second antenna section, and the first connecting section to connect with the ground. The layout is separated into the first antenna section, the second antenna and the first connecting section by the first switch assembly, and the first switch assembly controls the first antenna section, the second antenna and the first connecting section to connect with each other and to separate from each other. Therefore, the first switch assembly controls the first antenna loop to form and to separate from three sections. There are several first geometric structures arranged in the first antenna section and there are many second geometric structures arranged in the second antenna section. Therefore, when the first antenna section, the second antenna and the first connecting section are separated from each other by the first switch assembly, the first antenna section and the second antenna section can be respectively uses as a series of the capacitance induction elements for capacitance induction. In consequence of this structure, capacitance detection elements are integrated with the antenna loops into an antenna loop and they are formed on the same substrate. Therefore, the layout unlike the conventional input inputting device having both functions of capacitance induction and electromagnetic induction to form the capacitance detection elements and the antenna loops on different substrates. This layout can be formed on the substrate by printing or a mask. Therefore, the cost of fabricating this layout is reduced and the process for fabricating this layout is simplified. Furthermore, the capacitance induction elements will not shield the antenna loops from the electromagnetic signals anymore because the capacitance induction elements are parts of the antenna loops. Therefore, this layout for antenna loops can have both functions of capacitance induction and electromagnetic induction and have the characteristics of low cost and simple fabricating process.

Therefore, the effect achieved with the present invention is to provide a layout for antenna loops having both functions of capacitance induction and electromagnetic induction. In this layout, the capacitance detection elements are integrated with the antenna loops for avoiding the situation that the capacitance detection elements shields the antenna loops from the electromagnetic signals. Furthermore, the cost of this layout can be reduced and the process for fabricating this layout can be simplified.

DESCRIPTION OF THE EXEMPLARY EMBODIMENTS

Although the present invention will be described in accordance with following embodiments, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Unless expressly stated otherwise, identical elements have been provided with the same reference symbols through all figures.

Figure 1A:
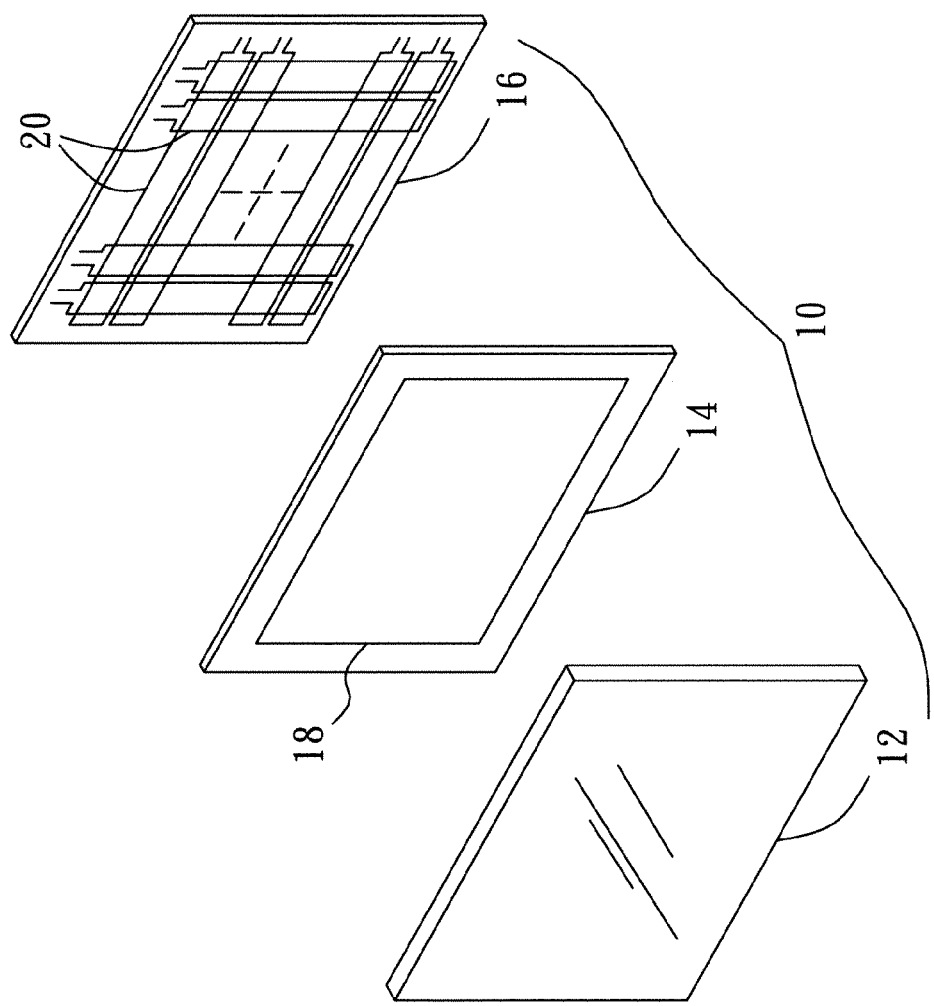
FIG. 1A is an exploded diagram illustrating a conventional inputting device having both function capacitance induction and electromagnetic induction.
Figure 1B:
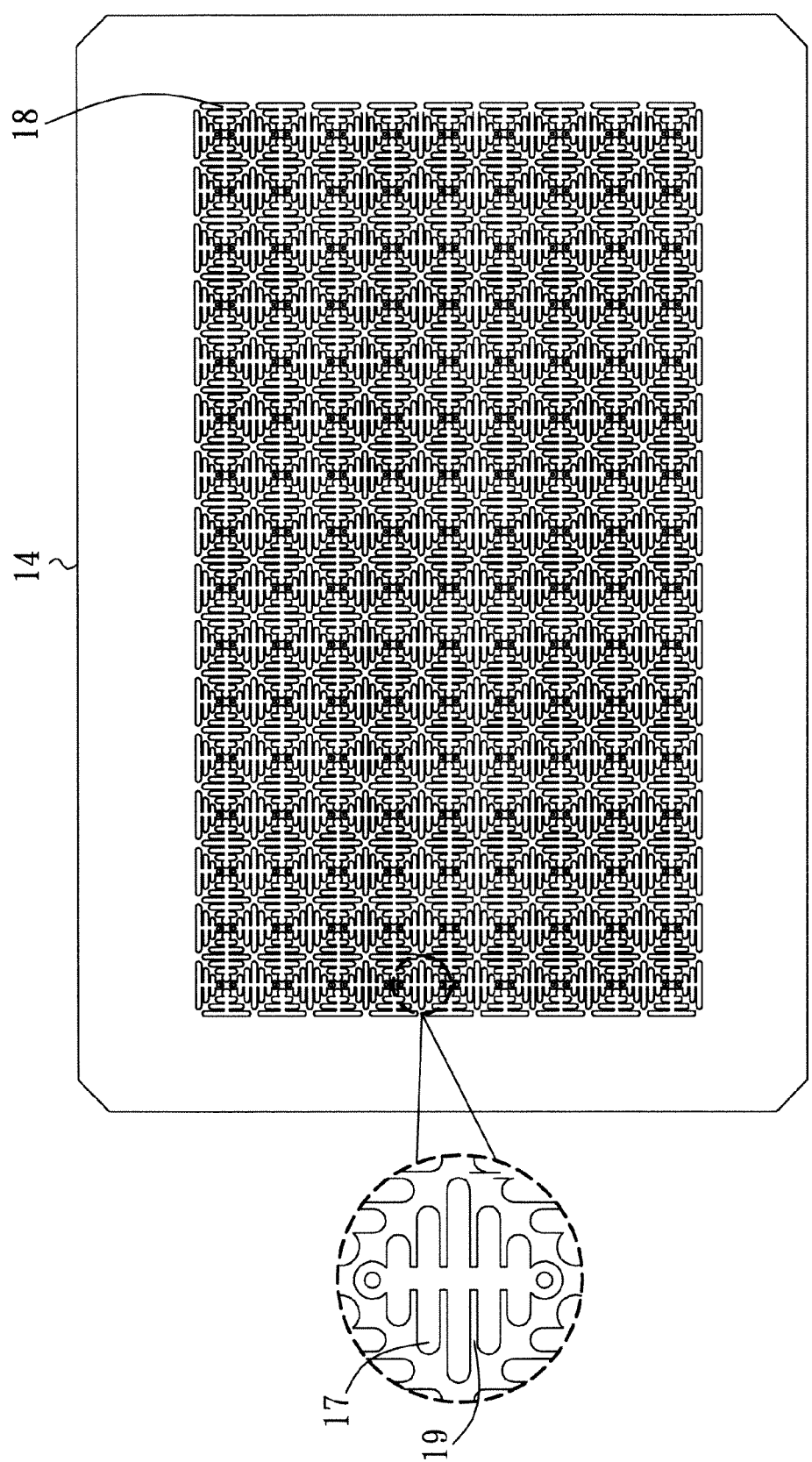
FIG. 1B is a top view diagram illustrating the touch board of the conventional inputting device showed in FIG. 1A.
Figure 2A:
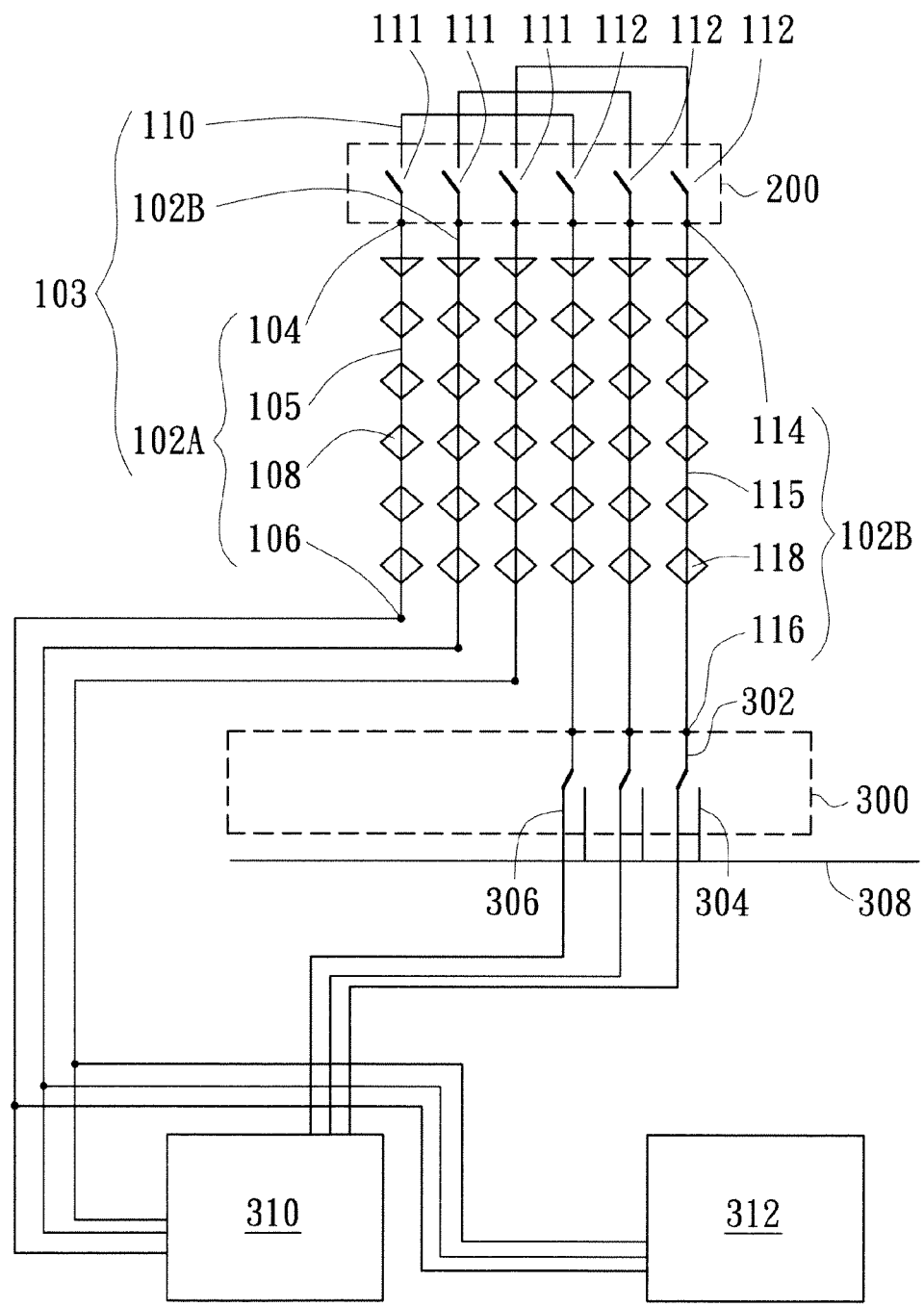
FIG. 2A is a plane view form diagram illustrating a layout for antenna loops having both functions of capacitance induction and electromagnetic induction in accordance with one embodiment of the present invention.

Referring to FIG. 2A, it is a plane view form diagram illustrating a layout 100 for antenna loops having both functions of capacitance induction and electromagnetic induction in accordance with one embodiment of the present invention. The layout 100 is distributed in X-direction of two-dimensional coordinates. The layout 100 for antenna loops having both functions of capacitance induction and electromagnetic induction comprises first antenna sections 102A, second antenna sections 102B, first connecting sections 110, a first switch assembly 200, a ground 308, and a ground switch assembly 300.

Each of the first antenna sections 102A has a first connecting terminal 104, a first signal terminal 106 and several first geometric structures 108 arranged in the first antenna section 102A. Each of the second antenna sections 102B is corresponded to one of the first antenna sections 102A, and each of the second antenna sections 102B is parallel to the corresponded first antenna section 102A. Each of the second antenna sections 102B has a second connecting terminal 114, a second signal terminal 116 and several second geometric structures 118 arranged in the second antenna section 102B. Each of the first connecting sections 110 is corresponded to one of the first antenna sections 102A and one of the second antenna sections 102B and the first connecting section 110 is (perpendicularly or non-perpendicularly) deposed between the corresponded first antenna section 102A and the corresponded second antenna section 102B for connecting the corresponded first antenna section 102A with the corresponded second antenna section 102B. Each of the first connecting sections 110 is a n-shaped (or ⊓-shaped) antenna loop. One end of the first connecting section 110 is corresponded to the first connecting terminal 104 of the corresponded first antenna section 102A, and another end of the first connecting section 110 is corresponded to the second terminal 114 of the corresponded second antenna section 102B.

The first antenna section 102A is a linear antenna or line 105 having the first geometric structures 108 formed therein. A metal layer deposited on the substrate is patterned to form the first antenna section 102A by a mask having the shape of the first antenna section 102A (including the first geometric structures 108 and the linear antenna or line 105). Or, a metal layer is directly printed or deposited on the substrate with a mask having the shape of the first antenna section 102A thereon to form the first antenna section 102A. Therefore, the first geometric structures 108 are integrated with the linear antenna 105 into one antenna, and the first geometric structures 108 are parts of the linear antenna 105. Similarly, the second antenna section 102B is a linear antenna or line 115 having the second geometric structures 118 formed therein. The second antenna section 102B is formed by the same method for fabricating the first antenna section 102B. Therefore, the second geometric structures 118 are integrated with the linear antenna 115 into one antenna, and the second geometric structures 118 are parts of the linear antenna 115. Furthermore, the first geometric structures 108 are arranged in the first antenna section 102A with equidistance, and the second geometric structures 118 are arranged in the second antenna section 102B.

Both of the first geometric structures 108 and the second geometric structures 118 can be used as capacitance induction elements because they are made of a metal, for example copper. The first antenna section 102A formed by the linear antenna 105 connecting several first geometric structures 108 in series can be used as a series capacitance induction elements, and the second antenna section 102B formed by the linear antenna 115 connecting several second geometric structures 118 in series can also be used as a series capacitance induction elements. It is because the linear antennas 105 and 115 are made of a metal.

The first switch assembly 200 is deposed between the first connecting terminal 104 and the first connecting section 110 and between the second connecting terminal 114 and the first connecting section 110. It means that the first switch assembly 200 is deposed between the first antenna section 102A and the first connecting section 110 and between the second antenna section 102B and the first connecting section 110 for controlling the first antenna section 102A, the second antenna section 102B corresponded to the first antenna section 102A, and the first connecting section 110 (corresponded to the first antenna section 102A and the second antenna section 102B) to be electrically connected with each for forming a first antenna loop 103 distributed in X-direction of two-dimensional coordinates.

The first switch assembly 200 comprises several first switches 111 deposed between the first connecting terminals 104 and the first connecting sections 110, and several second switches 112 deposed between the second connecting terminals 114 and the first connecting sections 110. Each of the first switches 111 is corresponded to one first antenna section 102A and one end of the first connecting section 110 (the end corresponded to the first antenna section 102A), and each of the first switches 111 is respectively connected with the first connecting terminal 104 of the corresponded first antenna section 102A and the end of the corresponded first connecting section 110 for controlling the first connecting terminal 104 of the first antenna section 102A to electrically connect with the first connecting section 110. It means that the first switch 111 controls the first antenna section 102A to electrically connect with the first connecting section 110. Each of the second switches 112 is corresponded to one second antenna section 102B and another end of the first connecting section 110 (the end corresponded to the second antenna section 102B), and each of the second switches 112 is respectively connected with the second connecting terminal 114 of the corresponded second antenna section 102B and another end of the corresponded first connecting section 110 for controlling the second connecting terminal 114 of the second antenna section 102B to electrically connect with the first connecting section 110. It means that the second switch 111 controls the second antenna section 102B to electrically connect with the first connecting section 110.

The ground switch assembly 300 is connected with all second signal terminals 116 of the second antenna sections 102B for controlling the second signal terminals 116 to electrically connect with the ground 308. The ground is used for being a ground of this layout 100. There are several first transferring switches 302, several first ground lines 304 and several first signal transmitting lines 306 deposed in the ground switch assembly 300. Each of the first transferring switches 302 is corresponded to one second signal terminal 116 of the second antenna section 102B, and it is electrically connected with the corresponded second signal terminal 116. Each of the first ground lines 304 is electrically connected with the ground 308. Furthermore, each of the first transferring switches 302 is corresponded to one first ground line 304 and one first signal transmitting line 306, and the first ground line 304 and the first signal transmitting line 306, which are corresponded to the same first transferring switch 302, are deposed in the ground switch assembly 300 and they are adjacent to each other. Therefore, first transferring switch 302 can be switch between the corresponded first ground line 304 and the corresponded first signal transmitting line 306 for controlling the second signal terminal 116 of the second antenna 102A to electrically connect with the first ground line 304 for grounding or to electrically connect with the first signal transmitting line.

Besides, the layout 100 further comprises a signal processing unit 310 for processing capacitance induction and electromagnetic induction detected or received by the layout 100, and a loops selecting unit 312 for controlling the different first antenna loop to scan. The signal processing unit 300 is electrically connected with the first signal terminal 106 of the first antenna section 102A and the first signal transmitting line 306 respectively, for processing the signals, which caused by capacitance induction and transmitted from the first signal terminal 106 and the first signal transmitting line 306, and for processing the signals, which caused by electromagnetic induction and transmitted from the first signal terminal 106 and the first signal transmitting line 306. The loops selecting unit 312 is electrically connected with all the first signal terminals 106 for controlling each first antenna loops 103 in the layout 100 to scan in order. As this embodiment (showed in FIG. 2A), the first signal terminals 106 can be electrically connected respectively with the signal processing unit 310 and the loops selecting unit 312 by different lines, but not limits. In another embodiment of this invention, the first signal terminals 106 can be electrically connected respectively with the signal processing unit 310 and the loops selecting unit 312 by the same line extending from the first signal terminals 106.

In the layout 100 having both functions of capacitance induction and electromagnetic induction, each of the first antenna loops 103 distributed in X-direction of two-dimensional coordinates are separated into the three parts of the first antenna section 102A, the second first antenna section 102B and the first connecting section 110 by the first switch assembly 200.

When the first switches 111 and the second switches in the first switch assembly 200 are switched on, the two ends of the first connecting sections 110 are separated from the first connecting terminals 104 and the second connecting terminals 114 respectively, and the two ends of the first connecting sections 110 are not electrically connected with the first connecting terminals 104 and the second connecting terminals 114. Therefore, the first antenna loops 103 are separated into the first antenna sections 102A, the second first antenna sections 102B and the first connecting sections 110, and they are not connected and electrically connected with each other. Each of the first antenna sections 102A and each of the second antenna sections 102B can be respectively used as a series capacitance inductions elements distributed in X-direction of two-dimensional coordinates at this situation because each of the first antenna sections 102A has the first geometric structures 108 capable of being capacitance induction elements and each of the second antenna sections 102B has the second geometric structures 118 capable of being capacitance induction elements. Therefore, an array of capacitance induction elements distributed in X-direction of two-dimensional coordinates is formed by the first antenna sections 102A and the second antenna section 102B for capacitance induction and for detecting or receiving the signals caused by capacitance induction. At the same time, each of the first transferring switches 302 connected the second signal terminals 116 of the second antenna sections 102B is switched to connect with the first signal transmitting line 306. Therefore, the second antenna section 102B is electrically connected with the signal processing unit 310 through the first signal transmitting line 306. The first signal terminal 106 of the first antenna section 102A is electrically connected with the signal processing unit 310. Therefore, the first antenna section 102A and the second antenna section 102B receive or detect the signals caused by capacitance induction, and then the signals are transmitted to the signal processing unit 310 respectively by the first signal terminal 106 and the first signal transmitting line 306 (through the second terminal 116). After, the signals are processed, calculated and recorded by the signal process unit 310.

Figure 2B:
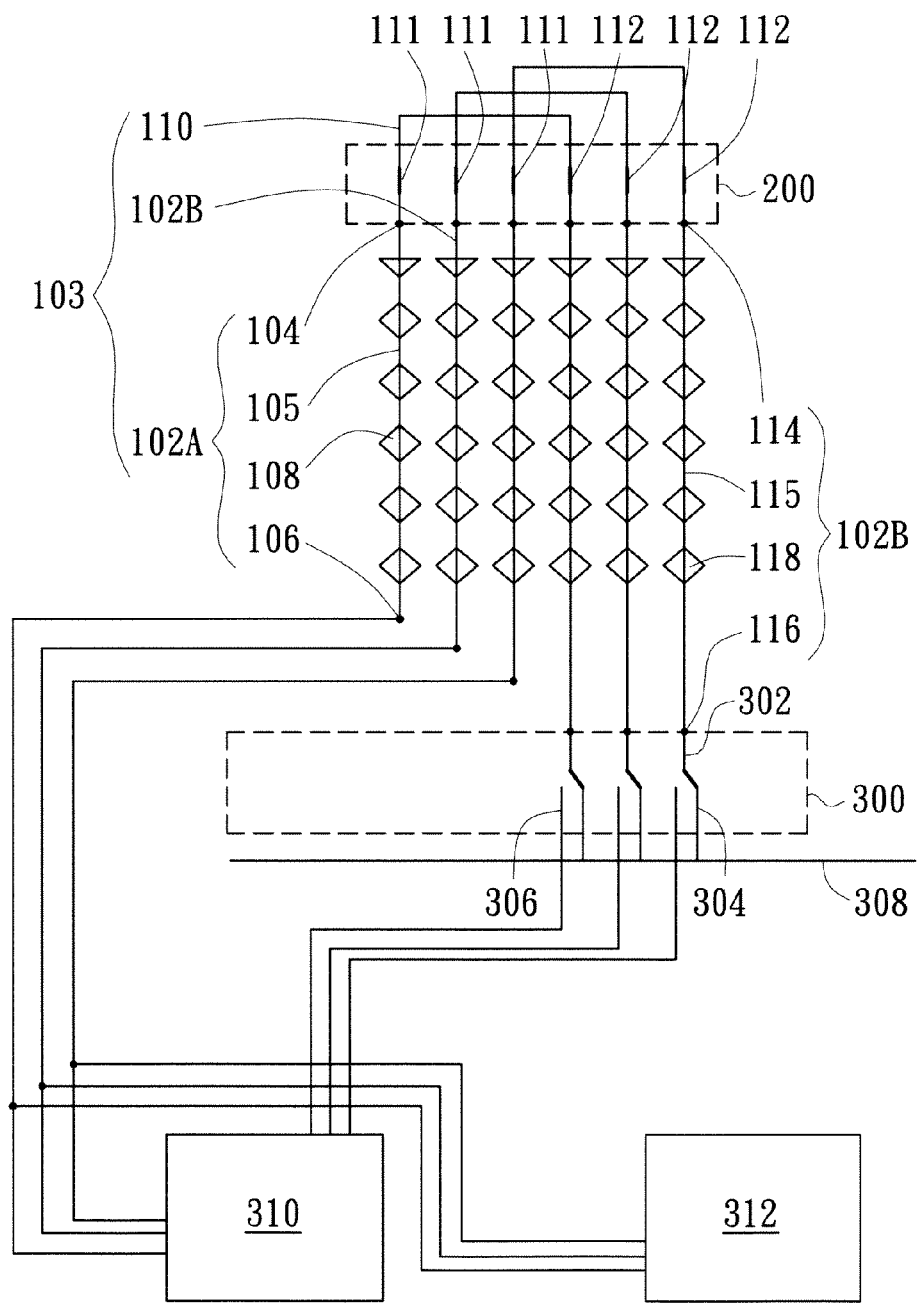
FIG. 2B is a plane view form diagram illustrating a layout showed in FIG. 2A with first antenna loops formed therein in accordance with one embodiment of the present invention.

Referring to FIG. 2B, when the first switches 111 and the second switches 112 in the first switch assembly 200 are switched off, the two ends of the first connecting sections 110 are electrically connected with the first connecting terminals 104 and the second connecting terminals 114 respectively. Therefore, the first antenna sections 102A, the second antenna sections 102B and the first connecting sections 110 are connected and electrically connected with each other to form the first antenna loops 103 which are n-shaped and distributed in X-direction of two-dimensional coordinates. The first antenna loops 103 are formed for electromagnetic induction. At the same time, the first transferring switch 302 connected with the second signal terminal 116 is switched to connected and electrically connected with the first ground line 304. Therefore, the first antenna loops 103 formed by connection of the first antenna sections 102A, the second antenna sections 102B and the first connecting sections 110 are electrically connected with the ground 308 through the first ground lines 304.

At this situation, the first antenna section 102A, the second antenna section 102B and the first connecting section 110 (even including the first geometric structures 108 and the second geometric structures 118) are parts of the first antenna loop 103, and all of them are formed on the same substrate for receiving the electromagnetic signals emitted or reflected by a pointing device. Therefore, the capacitance induction elements (the first geometric structures 108 and the second geometric structures 118) will not shield the first antenna loops 103 form the electromagnetic signals emitted or reflected by a pointing device. Furthermore, at this situation, the loops selecting unit 312 respectively controls different first antenna loops 103 to scan and detect the electromagnetic signals in order, and the electromagnetic signals are transmitted to the signal processing unit 310 through the first signal terminals electrically connected with the signal processing unit 310. And then, the signal processing unit 310 processes, calculates and records the electromagnetic signals.

In the layout 100, the first antenna loop 103 distributed in X-direction of two-dimensional coordinates are separated into the first antenna section 102A, the second antenna section 102B and the first connecting section 110 without connecting with each other. When the first antenna section 102A is separated from the second antenna section 102B, the first antenna section 102A and the second antenna section 102B can be used as two series capacitance induction elements which are separated from each other. It is because that there are the first geometric structures 108 capable of being the capacitance induction elements are formed in the first antenna section 102A and there are the second geometric structures 118 capable of being the capacitance induction elements are formed in the second antenna section 102B. Therefore, the first switch assembly 200 can control the first antenna section 102A, the second antenna section 102B and the first connecting section 110 to connect with each other for forming the antenna loop 103 for electromagnetic induction, or control the first antenna section 102A, the second antenna section 102B and the first connecting section 110 to separate from each other to apply the first antenna section 102A to be a series of the capacitance induction elements and to apply the second antenna section 102B to be a series of the capacitance induction elements for capacitance induction. Therefore, each first antenna loop 103 of the layout 100 can be used as a antenna for detecting the electromagnetic signals and as a series of capacitance induction elements for detecting the signals caused by capacitance induction. Therefore, the layout 100 can have both functions of capacitance induction and electromagnetic induction.

Therefore, unlike the conventional inputting device having both functions of capacitance induction and electromagnetic induction has a need to form the capacitance induction elements on anther substrate for forming a touch board and then the touch board and the antenna loop board are assembled to form the conventional inputting device, the layout 100 (including the antenna loops and the capacitance induction elements) are directly formed on a substrate by a simple process, for example printing. The method for fabricating the layout 100 is simpler and the cost of the layout 100 can be reduced because it has no need to form a touch board. Furthermore, no matter detect the capacitance induction or electromagnetic induction, the antenna loops and capacitance induction elements do not interfere with each other. It is because the first antenna loop 103 still applies parts of the first antenna loop 103 to be capacitance induction elements and all parts of the antenna loop 103 are deposed on the same substrate, even when the layout 100 detects the signals caused by capacitance induction. The capacitance induction elements do not shield the first antenna loop 103 from the electromagnetic signals emitted or reflected by a pointing device because the capacitance induction elements themselves are parts of the first antenna loop 103 which can receive and detect the electromagnetic signals.

Figure 2C:
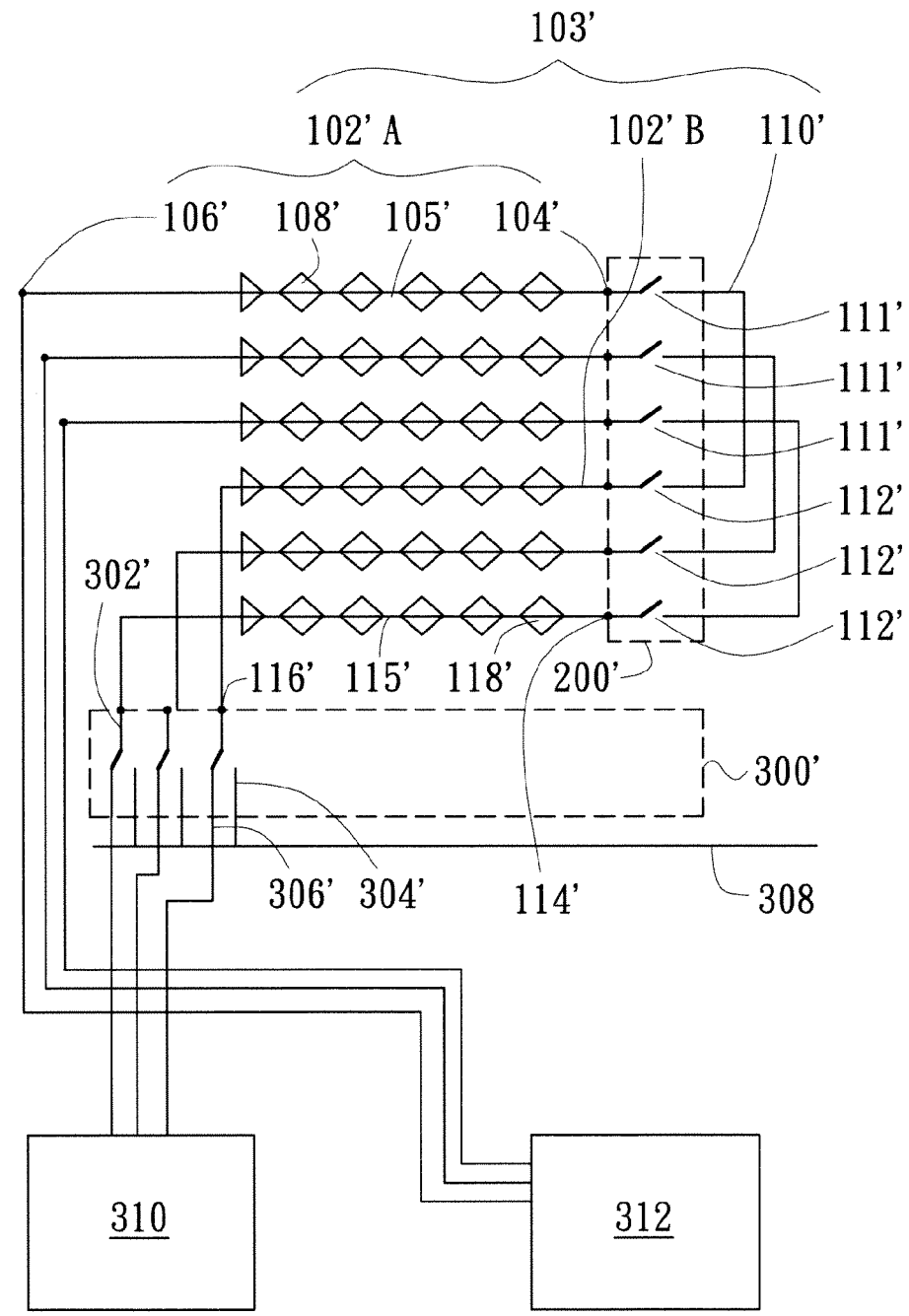
FIG. 2C is a plane view form diagram illustrating a layout for antenna loops having both functions of capacitance induction and electromagnetic induction in accordance with another embodiment of the present invention.

However, in other embodiments of this invention, the lay for antenna loops having both functions of capacitance induction and electromagnetic induction can be distributed in Y-direction of two-dimensional coordinates. Referring to FIG. 2C, it is a plane view form diagram illustrating a second layout 100' for antenna loops having both functions of capacitance induction and electromagnetic induction, which is distributed in Y-direction of two-dimensional coordinates, in accordance with another embodiment of the present invention. The second layout 100' has similar structure to the layout 100. The only difference between the second layout 100' and the layout 100 is that they are respectively distributed in different directions of two-dimensional coordinates. The second layout 100' comprises the third antenna sections 102'A, the fourth antenna section 102'B, the second connecting sections 110', the second switch assembly 200', the ground 308 and the ground switch assembly 300', and they are similar to the first antenna sections 102A, the second antenna section 102B, the first connecting sections 110, the first switch assembly 200, the ground 308 and the ground switch assembly 300. Therefore, they are not described herein again.

Each of the third antenna section 102'A is a linear antenna (or line) 105' having a third connecting terminal 104', a third signal terminal 106', and several third geometric structures 108' arranged therein. Each of the fourth antenna sections 102'B is a linear (or line) 115' having a fourth connecting terminal 114', a fourth signal terminal 116', and several fourth geometric structures 118' arranged therein. The second switch assembly 200' comprises several third switches 111' deposed between the third connecting terminals 104' and the second connecting sections 110', and several fourth switches deposed between the fourth connecting terminals 114' and the second connecting sections 110'. There are several second transferring switches 302', several second ground lines 304', and several second signal transmitting lines 306' deposed in the ground switch assembly 300'. The third switches 111' and the fourth switches 112' of the second switch assembly 200' are similar to the first switches 111 and the second switches 112 of the first switch assembly 200, and the second transferring switches 302', the second ground lines 304' and the second signal transmitting lines 306' of the ground switch assembly 300' are similar to the first transferring switches 302 the first ground lines 304 and the first signal transmitting lines 306 of the ground switch assembly 300. Therefore, they are mentioned and described herein again.

Similarly, the second layout 100' controls the third antenna section 102'A, the fourth antenna section 102'B and the second connecting section 110' to connect and electrically connect with each other by the second switch assembly 200' for forming the second antenna loop 103' distributed in Y-direction of two-dimensional coordinates. The second antenna loop 103' distributed in Y-direction of two-dimensional coordinates is applied to receive and detect the electromagnetic signals. Similarly, the second layout 100' controls the third antenna section 102'A, the fourth antenna section 102'B and the second connecting section 110' to separate from each other by the second switch assembly 200' for applying the third antenna section 102'A to be a series of capacitance induction elements distributed in Y-direction of two-dimensional coordinates and for applying forth antenna section 102'B to be a series of capacitance induction elements distributed in Y-direction of two-dimensional coordinates. Therefore, the second layout 100' also has both functions of capacitance induction and electromagnetic induction. The capacitance induction elements (the third geometric structures 108' and the fourth geometric structures 118') do not shield the second antenna loops 103' from receiving the electromagnetic signals emitted or reflected from the pointing device and the second layout 100' has no need of extra touch board. It is because the capacitance induction elements (the third geometric structures 108' and the fourth geometric structures 118') themselves are parts of the second antenna loop 103'.

Figure 2D:
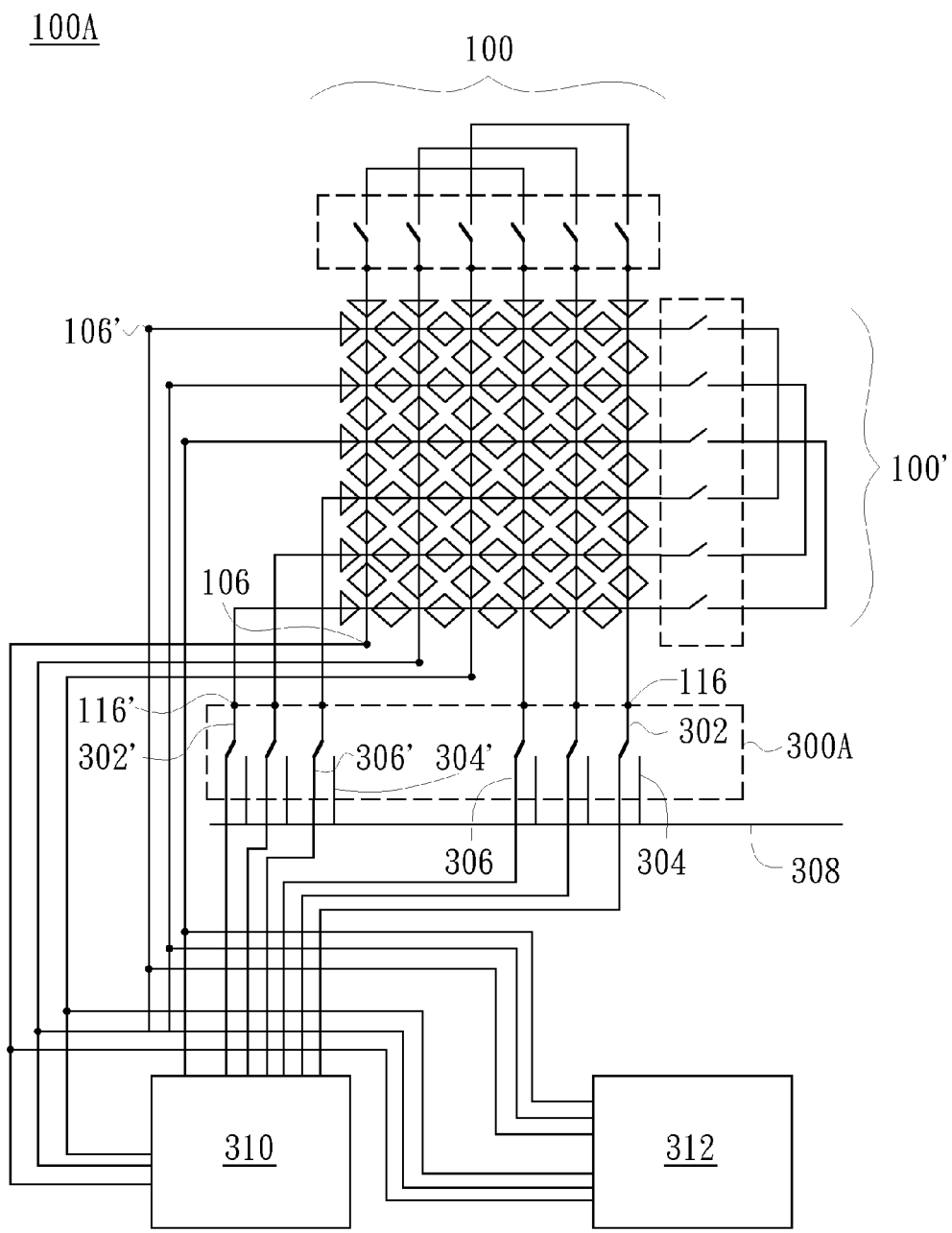
FIG. 2D is a plane view form diagram illustrating a layout for antenna loops having both functions of capacitance induction and electromagnetic induction in accordance with still another embodiment of the present invention.

Furthermore, in another embodiment of this invention, the layout for antenna loops having both functions of capacitance induction and electromagnetic induction can comprise the layout for antenna loops distributed in X-direction of two-dimensional coordinates and the layout for antenna loops distributed in Y-direction of two-dimensional coordinates simultaneously. Referring to FIG. 2D, the layout 100A for antenna loops having both functions of capacitance induction and electromagnetic induction comprises a the layout 100 for antenna loops distributed in X-direction of two-dimensional coordinates and the second layout 100' for antenna loops distributed in Y-direction of two-dimensional coordinates. The layout 100A is formed by stacking the layout 100 distributed in X-direction of two-dimensional coordinates with the second layout 100' distributed in Y-direction of two-dimensional coordinates. The layout 100 and the second layout 100' have been mentioned and described before, so they are not mentioned herein again. There are an isolation layer (not showed in FIG. 2D) deposed between the layout 100 and the second layout 100' for prevent them form short caused by contact.

However, the ground switch assembly 300A of the layout 100A comprises both of the first transferring switches 302 and the second transferring switches 302'. Each of the first transferring switches 302 is electrically connected with one second signal terminals 116 in the layout 100 and each of the first transferring switches 302 is corresponded to one first ground line 304 and one first signal transmitting line 306. Similarly, each of the second transferring switches 302' is electrically connected with one fourth signal terminals 116' in the second layout 100' and each of the second transferring switches 302' is corresponded to one second ground line 304' and one second signal transmitting line 306'.

Figure 3:
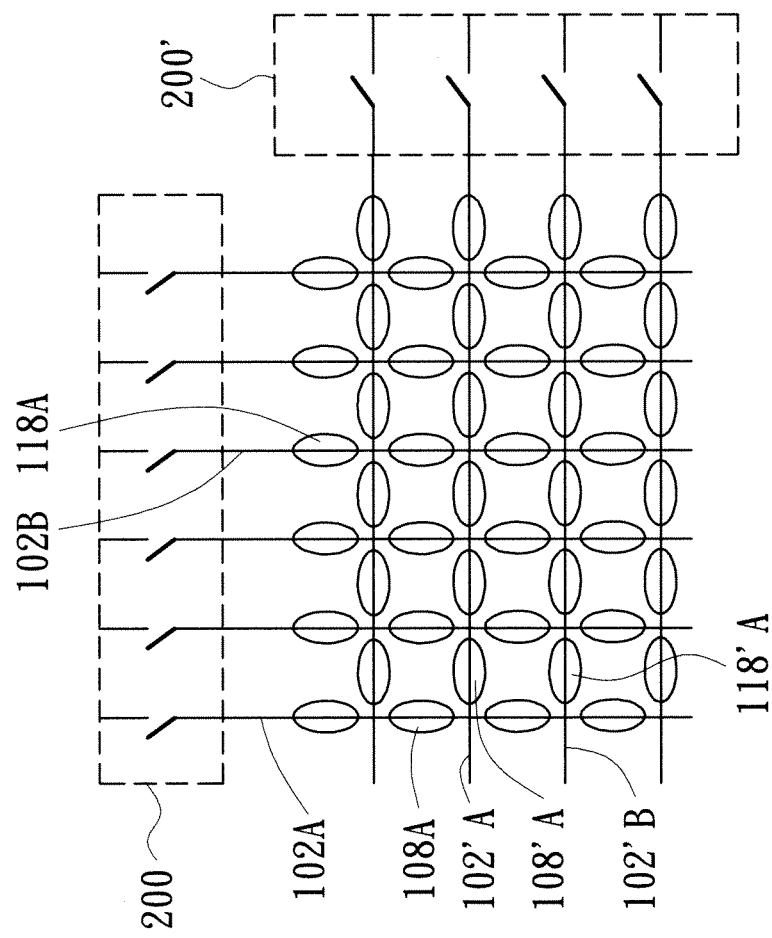
FIG. 3 is a plane view form diagram illustrating a layout for antenna loops having both functions of capacitance induction and electromagnetic induction and having elliptic-shaped capacitance induction elements in accordance with still another embodiment of the present invention.

In above mentioned layout 100, 100' and 100A for antenna loops having both functions of capacitance induction and electromagnetic induction, the first geometric structures 108, the second geometric structures 118, and the third geometric structures 108' and the fourth geometric structures 118' are diamond-shape structures or triangular-shaped structures, but not limits. Any shape, which is fabricated easily and is easy and convenient to calculate the signals caused by capacitance induction and electromagnetic induction and to calculate the position of the pointing device, can be applied to the first geometric structures 108, the second geometric structures 118, and the third geometric structures 108' and the fourth geometric structures 118', for example elliptic-shaped structures. Referring to FIG. 3, in the layout for antenna loops having both functions of capacitance induction and electromagnetic induction illustrated therein, the first geometric structures 108A deposed in the first antenna section 102A, the second geometric structures 118A deposed in the second antenna section 102B, and the third geometric structures 108'A deposed in the third antenna section 102'A and the fourth geometric structures 118'A deposed in the fourth antenna section 102'B are the elliptic-shaped structures.

Besides, although above mentioned layout 100, 100' and 100A have several first antenna loops 103, several second antenna loops 103' or both, but not limits. In other embodiments of this invention, the first antenna loops 103 or the second antenna loops 103' can be increased or decreased according to requirement and design. However, no matter how many the first antenna loops 103 or the second antenna loops 103' is added or increased, or there is only one first antenna loops 103 or second antenna loops 103' in the layout, the layout of this invention has at least one first antenna loops 103 or second antenna loops 103'. Therefore, these layout of this invention comprises at least one first antenna section (or third antenna section), at least one second antenna section (or fourth antenna section), at least one first connecting section (or second connecting section), at least one first switch (or third switch), at least one second switch (or fourth switch), at least one first transferring switch (or second transferring switch), at least one first ground line (or second ground line), and at least one first signal transmitting line (or second signal transmitting line).

Figures 4, 4A, 4B:
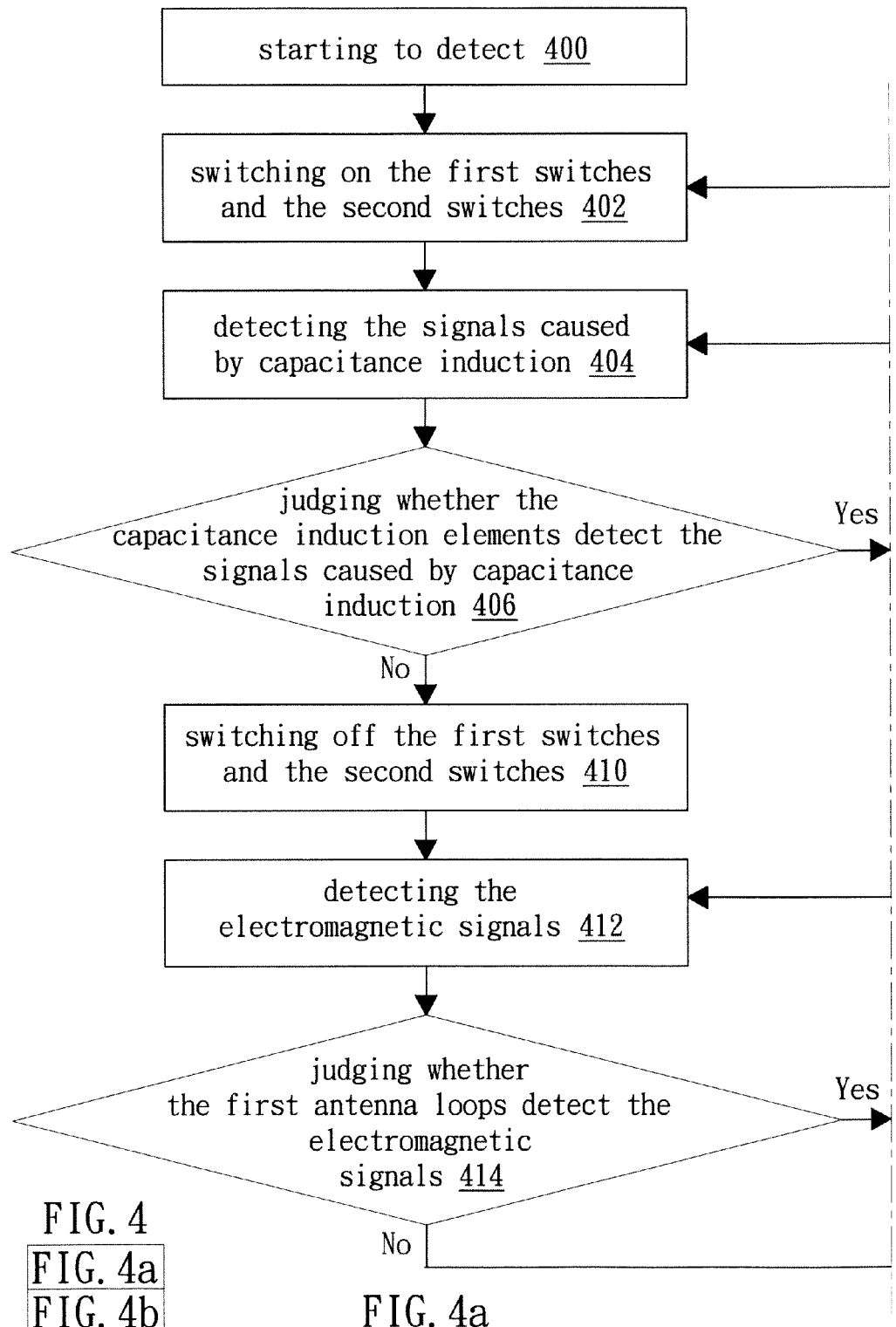
FIG. 4 (including FIG. 4a and FIG. 4b) is a block diagram illustrating the detecting method of the layout for antenna loops having both functions of capacitance induction and electromagnetic induction in accordance with one embodiment of the present invention.
Figure 4B:
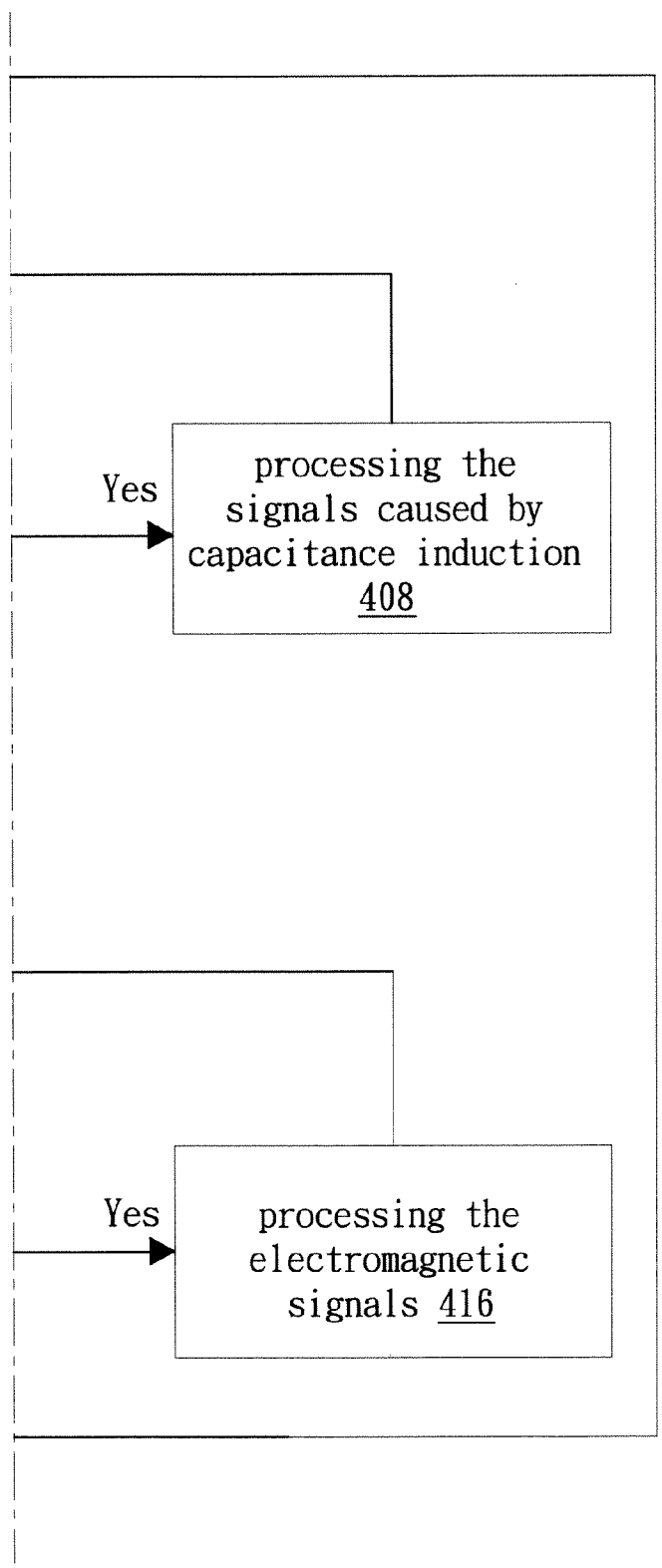

Above mentioned layout 100, 100' and 100A for antenna loops having both functions of capacitance induction and electromagnetic induction can adopt two different time-division-multiplexing methods to detect the signals caused by capacitance induction and electromagnetic induction for hand writing. Referring FIG. 4 (including FIG. 4*a* and FIG. 4*b*), it is a block diagram illustrating the detecting method of the layout for antenna loops having both functions of capacitance induction and electromagnetic induction in accordance with one embodiment of the present invention. Referring to FIG. 4 (including FIG. 4*a* and FIG. 4*b*) and FIG. 2A simultaneously, the layout 100 illustrated in FIG. 2A is taken as an examples to explain the detecting method illustrated in FIG. 4 (including FIG. 4*a* and FIG. 4*b*).

First, when an inputting device having the layout 100 is turned on or a user put a pointing device or his finger on the inputting device having the layout 100, the layout 100 start to detect or sense (step 400). Next, the first switches 111 and the second switches 112 are switched on for holding them in "OFF" situation (step 402). Therefore, the two ends of the first connecting section 110 are separated from the first antenna section 102A and the second antenna section 102B, and the two ends of the first connecting section 110 are not electrically connected with the first antenna section 102A and the second antenna section 102B. The first antenna section 102A is applied to be a series of capacitance induction elements and the second antenna section 102B is applied to be a series of capacitance induction elements, too. At the same time, the first transferring switch 302, which is electrically connected with the second signal terminal 116 of the second antenna section 102B, is switched to electrically connect with the first signal transmitting line 306, and the second antenna section 102B is electrically connected with the signal processing unit 310 by the first signal transmitting line 306.

After, the capacitance induction elements (the first antenna section 102A and the second antenna section 102B) in the layout 100 start to detect the signals caused by capacitance induction (step 404), and then the inputting device judges whether the capacitance induction elements (the first antenna section 102A and the second antenna section 102B) detect or sense the signals caused by capacitance induction (step 406). If the capacitance induction elements detect or sense the signals caused by capacitance induction, the signal detected by the first antenna section 102A are transmitted to the signal processing unit 310 by the first signal terminal 106 for processing, calculating and recording, and the signal detected by the second antenna section 102B are transmitted to the signal processing unit 310 by the first signal transmitting line 306 for processing, calculating and recording (step 408). And then, the layout 100 (or inputting device) repeats step 402 to step 408 for repeating to detect the signals caused by capacitance induction until the layout 100 (or inputting device) does not detect the signals caused by capacitance induction anymore.

If the capacitance induction elements (the first antenna section 102A and the second antenna section 102B) do not detect or sense any signal caused by capacitance in step 406, the layout 100 switches off the first switches 111 and the second switches 112 for hold them in "ON" situation (step 410). Therefore, the two ends of the first connecting section 110 is electrically connected with the first antenna section 102A and the second antenna section 102B respectively for forming the n-shaped (or ⊓-shaped) first antenna loop 103. At the same time, the first transferring switch 302 is switched from the first transferring line 306 to the first ground line 304 and for electrically connecting with the first ground line 304. Therefore, the first antenna loop 103 is electrically connected with the ground 308 by the first ground line 304. After, the loops selecting unit 312 controls different first antenna loops 103 to detect or scan the electromagnetic signals (or the signals caused by electromagnetic) in order (step 412), and then, the layout 100 (or the inputting device) judges whether the first antenna loops 103 detect the electromagnetic signals (or the signals caused by electromagnetic) (step 414).

If the first antenna loop 103 detects the electromagnetic signals, the electromagnetic signals detected by the first antenna loop 103 are transmitted to the signal processing unit 310 by the first signal terminal 106 of the first antenna section 102A for processing, calculating and recording the electromagnetic signals (step 416). After, the layout 100 (or the inputting device) repeats step 412 to step 416 for repeating to detect the electromagnetic signals until the layout 100 (or inputting device) does not detect the electromagnetic signals anymore. If the first antenna loops 103 (or the inputting device) do not detect any electromagnetic signal, the layout 100 (or the inputting device) goes back step 402 for switching on the first switches 111 and the second switches 112 again. At the same time, the transferring switch 302 is switched to electrically connect with the first signal transmitting line 306 again for re-starting the process of this method.

Figures 5, 5A, 5B:
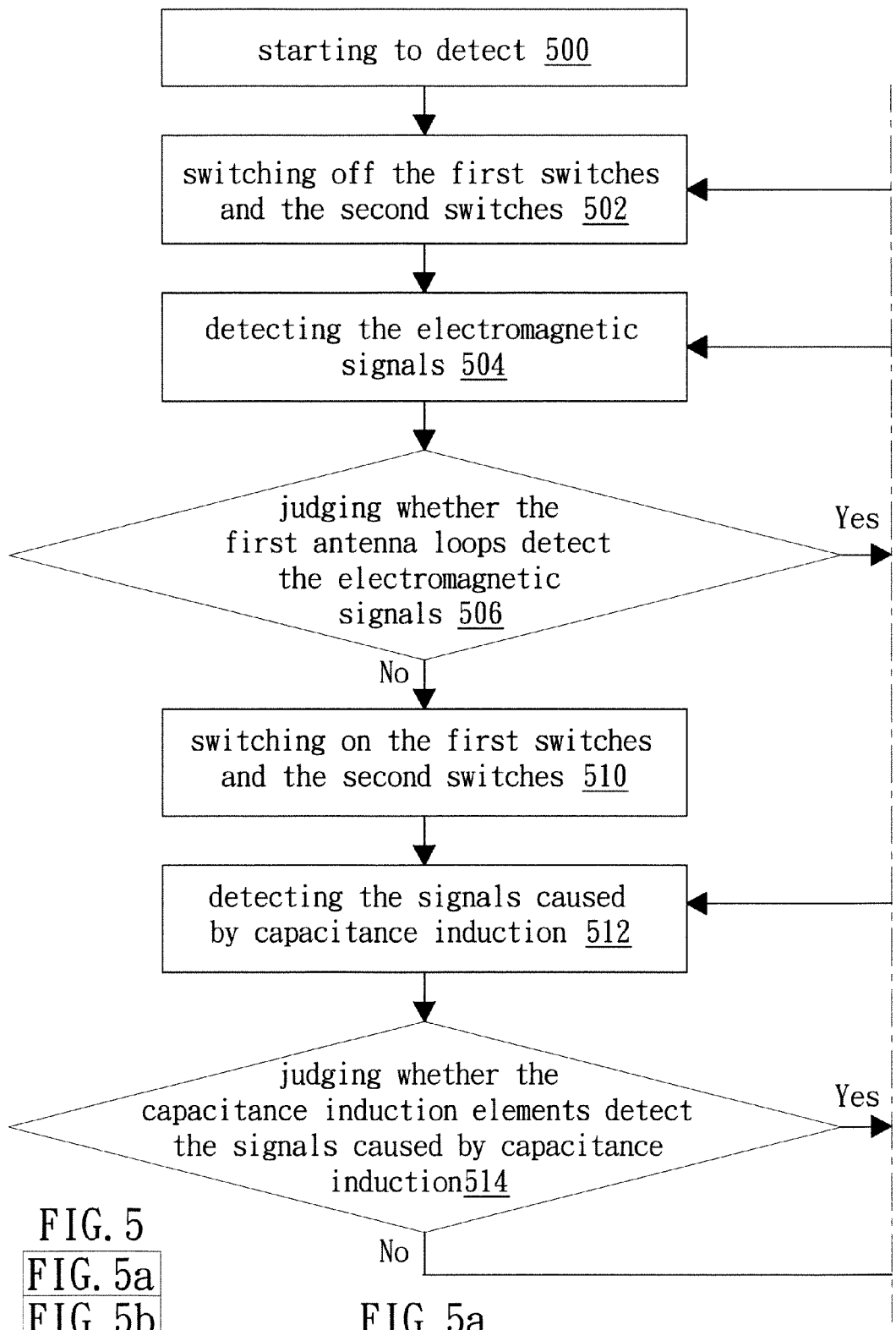
FIG. 5 (including FIG. 5a and FIG. 5b) is a block diagram illustrating the detecting method of the layout for antenna loops having both functions of capacitance induction and electromagnetic induction in accordance with another embodiment of the present invention.
Figure 5B:
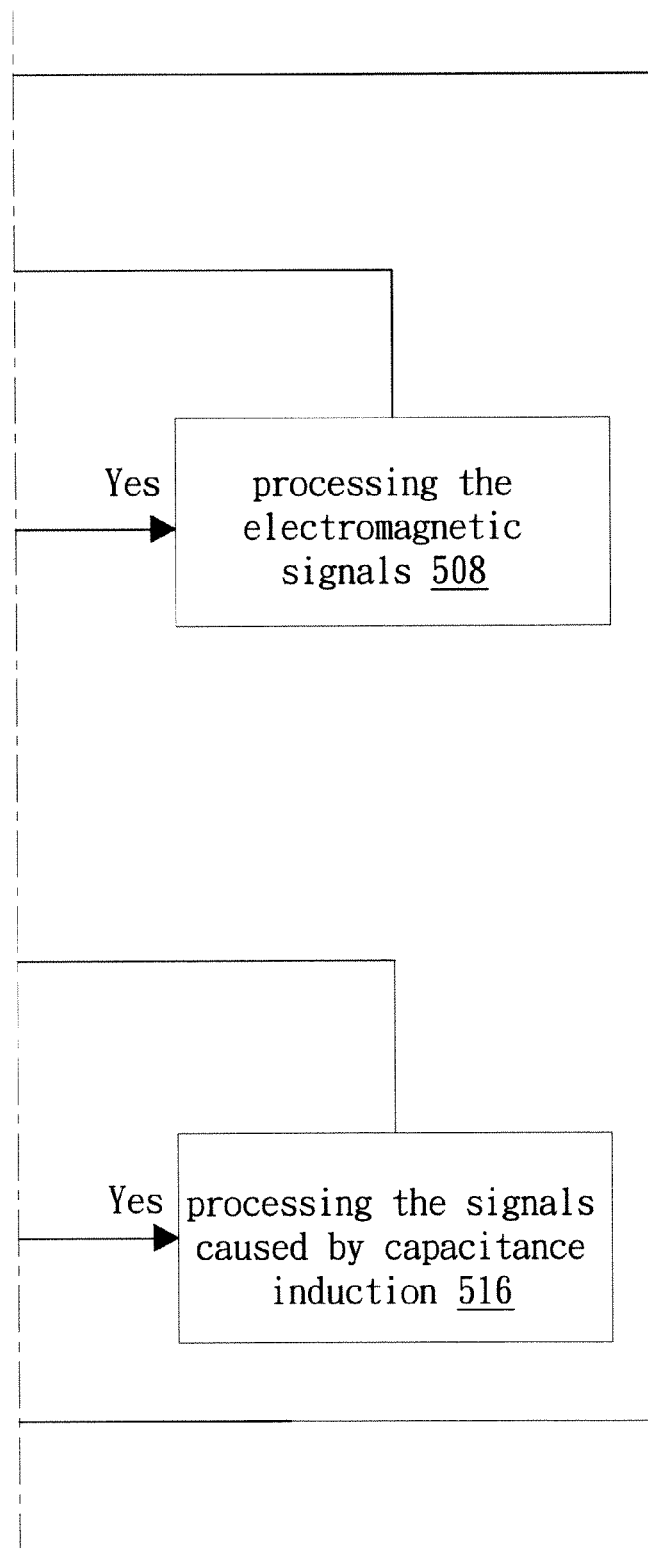

Referring FIG. 5 (including FIG. 5*a* and FIG. 5*b*), it is a block diagram illustrating the detecting method of the layout for antenna loops having both functions of capacitance induction and electromagnetic induction in accordance with another embodiment of the present invention. Referring to FIG. 5 (including FIG. 5*a* and FIG. 5*b*) and FIG. 2A simultaneously, the layout 100 illustrated in FIG. 2A is taken as an examples to explain the detecting method illustrated in FIG. 5 (including FIG. 5a and FIG. 5b).

First, when an inputting device having the layout 100 is turned on or a user put a pointing device or his finger on the inputting device having the layout 100, the layout 100 start to detect or sense (step 500). Next, the layout 100 switches off the first switches 111 and the second switches 112 for hold them in "ON" situation (step 502). Therefore, the two ends of the first connecting section 110 is electrically connected with the first antenna section 102A and the second antenna section 102B respectively for forming the n-shaped (or ⊓-shaped) first antenna loop 103. At the same time, the first transferring switch 302 is switched to the first ground line 304 and for electrically connecting with the first ground line 304. Therefore, the first antenna loop 103 is electrically connected with the ground 308 by the first ground line 304. After, the loops selecting unit 312 controls different first antenna loops 103 to detect or scan the electromagnetic signals (or the signals caused by electromagnetic) in order (step 504), and then, the layout 100 (or the inputting device) judges whether the first antenna loops 103 detect the electromagnetic signals (or the signals caused by electromagnetic) (step 506).

If the first antenna loop 103 detects the electromagnetic signals, the electromagnetic signals detected by the first antenna loop 103 are transmitted to the signal processing unit 310 by the first signal terminal 106 of the first antenna section 102A for processing, calculating and recording the electromagnetic signals (step 508). After, the layout 100 (or the inputting device) repeats step 502 to step 506 for repeating to detect the electromagnetic signals until the layout 100 (or inputting device) does not detect the electromagnetic signals anymore.

If the first antenna loops 103 (or the inputting device) do not detect any electromagnetic signal in step 506, the layout 100 switches on the first switches 111 and the second switches 112 for hold them in "OFF" situation (step 510). Therefore, the two ends of the first connecting section 110 are separated from the first antenna section 102A and the second antenna section 102B, and the two ends of the first connecting section 110 are not electrically connected with the first antenna section 102A and the second antenna section 102B. The first antenna section 102A is applied to be a series of capacitance induction elements and the second antenna section 102B is applied to be a series of capacitance induction elements, too. At the same time, the first transferring switch 302 is switched from the first ground line 304 to the first signal transmitting line 306 for electrically connect with the first signal transmitting line 306, and the second antenna section 102B is electrically connected with the signal processing unit 310 by the first signal transmitting line 306.

After, the capacitance induction elements (the first antenna section 102A and the second antenna section 102B) in the layout 100 start to detect the signals caused by capacitance induction (step 512), and then the inputting device judges whether the capacitance induction elements (the first antenna section 102A and the second antenna section 102B) detect or sense the signals caused by capacitance induction (step 514). If the capacitance induction elements detect or sense the signals caused by capacitance induction, the signal detected by the first antenna section 102A are transmitted to the signal processing unit 310 by the first signal terminal 106 for processing, calculating and recording, and the signal detected by the second antenna section 102B are transmitted to the signal processing unit 310 by the first signal transmitting line 306 for processing, calculating and recording (step 516. And then, the layout 100 (or inputting device) repeats step 512 to step 516 for repeating to detect the signals caused by capacitance induction until the layout 100 (or inputting device) does not detect the signals caused by capacitance induction anymore.

If the capacitance induction elements (the first antenna section 102A and the second antenna section 102B) do not detect or sense any signal caused by capacitance in step 514, the layout 100 (or inputting device) goes back step 502 for switching off the first switches 111 and the second switches 112 again. At the same time, the transferring switch 302 is switched to electrically connect with the first ground line 304 again for re-starting the process of this method.

Therefore, this invention provide a layout for antenna loops having both functions of capacitance induction and electromagnetic induction wherein parts of the antenna loop are applied to be capacitance induction elements (or touch elements) for integrated the capacitance induction elements with the antenna loop on the same substrate. Therefore, the method for fabricating this layout is simplified and the antenna loop can receives and detects the electromagnetic signals emitted or reflected by a pointing device without shielding caused by the capacitance induction elements.

What is claimed is:

1. A layout for antenna loops having both functions of capacitance induction and electromagnetic induction, comprising:

at least one first antenna section having a first connecting terminal, a first signal terminal, and several first geometric structures arranged in said first antenna section wherein said first antenna section is a linear antenna and said first geometric structures are connected with each other by said first antenna section and said first geometric structures are used as capacitance induction elements for capacitance induction;

at least one second antenna section having a second connecting terminal, a second signal terminal, and several second geometric structures arranged in said second antenna section, wherein each second antenna section is corresponded and parallel to one first antenna section wherein said second antenna section is a linear antenna and said second geometric structures are connected with each other by said second antenna section and said second geometric structures are used as capacitance induction elements for capacitance induction;

at least one first connecting section for connecting said first antenna section and the second antenna section corresponded to said first antenna section wherein said first connecting section is a n-shaped section;

a first switch assembly deposed between said first connecting terminal and said first connecting section and between said second connecting terminal and said first connecting section for controlling said first antenna section, said second antenna section and said first connecting section to be electrically connected with each other for forming a first antenna loop wherein said first antenna loop is separated into said first antenna section, said second antenna section and said first connecting section by said first switch assembly, said first antenna section is one section of said first antenna loop, said second antenna section is another section of said first antenna loop, said first antenna loop is a complete antenna loop capable of performing electromagnetic induction, and said first antenna loop performs electromagnetic induction only when said first antenna loop is completely formed by electrically connecting said first antenna section, said second antenna section and said first connecting section with said first switch assembly;

a ground for being a ground of said layout; and a ground switch assembly connected with said second signal terminal for controlling said second signal terminal to electrically connect with said ground.

2. The layout of claim 1, wherein said first antenna section is a linear antenna connecting said first geometric structures therein in series and said first geometric structures are arranged therein with equidistance.

3. The layout of claim 1, wherein said second antenna section is a linear antenna connecting said second geometric structures therein in series and said second geometric structures are arranged therein with equidistance.

4. The layout of claim 1, wherein both of said first geometric structures and said second geometric structures are capacitance detection elements.

5. The layout of claim 1, wherein said first geometric structures and said second geometric structures are diamond-shape structures or triangular-shaped structures.

6. The layout of claim 1, wherein said first geometric structures and said second geometric structures are elliptic-shaped structures.

7. The layout of claim 1, wherein said first switch assembly comprises:
at least one first switch deposed between said first connecting terminal and said first connecting section for connecting with said first connecting terminal and one end of said first connecting section respectively and for controlling said first antenna section to electrically connect with said first connecting section; and
at least one second switch deposed between said second connecting terminal and said first connecting section for connecting with said second connecting terminal and another end of said first connecting section respectively and for controlling said second antenna section to electrically connect with said first connecting section.

8. The layout of claim 7, wherein said ground switch assembly comprises:
at least one first transferring switch connected with said second signal terminal;
at least one first ground line electrically connected with said ground; and
at least one first signal transmitting line for transmitting signal wherein each first transferring switch is corresponded to one first ground line and one first signal transmitting line and said first transferring switch can be switched to connect with the corresponded first ground line or the corresponded first signal transmitting line for controlling said second signal terminal to electrically connect with the corresponded first ground line or the corresponded first signal transmitting line.

9. The layout of claim 8, further comprising a signal processing unit electrically connected with said first signal terminal and said first signal transmitting line respectively for processing capacitance induction and electromagnetic induction detected or received by said layout.

10. The layout of claim 9, further comprising a loops selecting unit electrically connected with said first signal terminal for controlling said first antenna loop to scan and for transmitting signal caused by electromagnetic induction to said signal processing unit to process and calculate.

11. The layout of claim 10, wherein when both of said first switch and said second switch are switched off, the two ends of said first connecting section are electrically connected with said first connecting terminal and said second connecting terminal respectively, and then said first transferring switch is switched to electrically connect with said first ground line for forming said first antenna loop for electromagnetic induction.

12. The layout of claim 11, wherein said first antenna loop is a n-shaped or ⊓-shaped antenna loop.

13. The layout of claim 11, wherein when both of said first switch and said second switch are switched on, the two ends of said first connecting section are separated from said first connecting terminal and said second connecting terminal respectively and are no long electrically connected with said first connecting terminal and said second connecting terminal for forming an array of capacitance detection elements wherein said first antenna section is parallel to said second antenna section.

14. The layout claim 13, wherein when both of said first switch and said second switch are switched on, said first transferring switch is switched to electrically connect with said first signal transmitting line and said second antenna section is electrically connect with said signal processing unit through said first signal transmitting line for transmitting signals caused by capacitance induction and detected by said second antenna section to said signal processing unit.

15. The layout of claim 11, wherein said layout distributes in one direction of two-dimensional coordinates.

16. The layout of claim 15, further comprising a second layout distributes in another direction of two-dimensional coordinates, and said second layout is perpendicular to said layout.

17. The layout of claim 16, wherein said first switch assembly comprises:
at least one third antenna section having a third connecting terminal, a third signal terminal, and several third geometric structures arranged in said third antenna section;
at least one fourth antenna section having a fourth connecting terminal, a fourth signal terminal, and several fourth geometric structures arranged in said fourth antenna section, wherein each fourth antenna section is corresponded and parallel to one third antenna section;
at least one second connecting section for connecting said third antenna section with the fourth antenna section corresponded to said third antenna section; and
a second switch assembly deposed between said third connecting terminal and said second connecting section and between said fourth connecting terminal and said second connecting section for controlling said third antenna section, said fourth antenna section and said second connecting section to be electrically connected with each for forming a second antenna loop.

18. The layout of claim 17, wherein said third antenna section is a linear antenna connecting said third geometric structures therein in series and said third geometric structures are arranged therein with equidistance.

19. The layout of claim 17, wherein said fourth antenna section is a linear antenna connecting said fourth geometric structures therein in series and said fourth geometric structures are arranged therein with equidistance.

20. The layout of claim 17, wherein both of said third geometric structures and said fourth geometric structures are capacitance detection elements.

21. The layout of claim 17, wherein said third geometric structures and said fourth geometric structures are diamond-shaped structures or triangular-shaped structures.

22. The layout of claim 17, wherein third geometric structures and said fourth geometric structures are elliptic-shaped structures.

23. The layout of claim 17, wherein said first switch assembly comprises:
at least one third switch deposed between said third connecting terminal and said second connecting section for connecting with said third connecting terminal and one end of said second connecting section respectively and for controlling said third antenna section to electrically connect with said second connecting section; and at least one fourth switch deposed between said fourth connecting terminal and said second connecting section for connecting with said fourth connecting terminal and another end of said second connecting section respectively and for controlling said fourth antenna section to electrically connect with said second connecting section.

24. The layout of claim 23, wherein said ground switch assembly further comprises:

at least one second transferring switch connected with said fourth signal terminal;

at least one second ground line electrically connected with said ground; and at least one second signal transmitting line for transmitting signal wherein each second transferring switch is corresponded to one second ground line and one second signal transmitting line and said second transferring switch can be switched to connect with the corresponded second ground line or the corresponded second signal transmitting line for controlling said forth signal terminal to electrically connect with the corresponded second ground line or the corresponded second signal transmitting line.

25. The layout of claim 24, wherein when both of said third switch and said fourth switch are switched off, the two ends of said second connecting section are electrically connected with said third connecting terminal and said fourth connecting terminal respectively, and then said second transferring switch is switched to electrically connect with said second ground line for forming said second antenna loop for electromagnetic induction.

26. The layout of claim 25, wherein said second antenna loop is a n-shaped or ⊓-shaped antenna loop.

27. The layout of claim 24, wherein when both of said third switch and said fourth switch are switched on, the two ends of said second connecting section are separated from said third connecting terminal and said fourth connecting terminal respectively and are no long electrically connected with said third connecting terminal and said fourth connecting terminal for forming an array of capacitance detection elements wherein said third antenna section is parallel to said fourth antenna section.

28. The layout claim 27, wherein when both of said third switch and said fourth switch are switched on, said second transferring switch is switched to electrically connect with said second signal transmitting line and said fourth antenna section is electrically connect with said signal processing unit through said second signal transmitting line for transmitting signals caused by capacitance induction and detected by said fourth antenna section to said signal processing unit.

29. The layout claim 16, further comprising an isolation layer deposed between said layout and said second layout for preventing said layout and said second layout form short caused by contact of said layout and said second layout.

* * * * *